United States Patent [19]
Rodriguez

[11] Patent Number: 5,937,877
[45] Date of Patent: Aug. 17, 1999

[54] APPARATUS FOR WASHING FOODSTUFFS

[76] Inventor: Jeffrey J. Rodriguez, 380 Whippet Run, Corralitos, Calif. 95076

[21] Appl. No.: 09/039,972

[22] Filed: Mar. 16, 1998

Related U.S. Application Data

[63] Continuation-in-part of application No. 08/935,747, Sep. 23, 1997.

[51] Int. Cl.$^6$ ........................................................ B08B 3/06
[52] U.S. Cl. ............................... 134/61; 15/3.15; 99/536; 134/25.3; 134/102.1; 134/104.3; 134/104.4; 134/182; 134/199
[58] Field of Search ............................... 134/25.3, 61, 65, 134/102.1, 102.2, 104.3, 104.4, 132, 182, 199; 15/3.14, 3.15; 99/536

[56] References Cited

U.S. PATENT DOCUMENTS

| | | | |
|---|---|---|---|
| 1,374,341 | 4/1921 | Vaudreuil | 134/25.3 X |
| 4,549,478 | 10/1985 | Entes | 99/536 |
| 5,148,566 | 9/1992 | Nishibayashi | 15/3.15 X |
| 5,744,184 | 4/1998 | Kendall et al. | 99/536 X |

*Primary Examiner*—Philip R. Coe
*Attorney, Agent, or Firm*—Jeffrey P. Aiello; Carol D. Titus; James J. Leary

[57] ABSTRACT

An improved apparatus for washing foodstuffs is provided. The invented apparatus utilizes hydro-energy to sufficiently clean a number of different types of foodstuffs processed thereby, while effectively using water circulating therethrough. The apparatus is configured to clean various types of foodstuffs ranging from different plant products to fish, such as sardines. The apparatus comprises a product loading assembly coupled to a cleansing flume, that is coupled to an overflow assembly. The loading assembly comprises a conical receiving section having a plurality of spray nozzles positioned about its inner periphery to form a turbulent water flow therethrough, that completely submerges product as it passes through the assembly. The conical receiving section ensures that a maximum product-water mixture is achieved to form a slurry that optimizes water usage and quickly cleans the product. The configuration of the loading assembly also dissipates the water energy to ensure that the product is not damaged, while inhibiting debris collection. The flume is configured to maintain product flowing therethrough substantially completely submerged for effectively cleaning the product, while optimizing workspace occupied by the apparatus. The overflow assembly maintains the water level in the flume and performs final cleaning of the product. The overflow assembly additionally prepares the product for de-watering by known devices.

19 Claims, 6 Drawing Sheets

APPARATUS FOR WASHING FOODSTUFFS

CROSS-REFERENCES TO RELATED APPLICATIONS

This application is a continuation-in-part of U.S. patent application Ser. No.: 08/935,747, filed Sept. 23, 1997 pending.

BACKGROUND OF THE INVENTION

1. Field of the Invention

The present invention relates generally to apparatus for industrial washing of various foodstuffs such as fruits and vegetables, and more particularly, to an improved apparatus for industrial washing of several different types of foodstuffs, ranging from various plant products to fish among others.

2. Description of Related Art

There are a number of devices in the prior art directed toward industrial cleaning of fruits and vegetables prior to packaging the fruits and vegetables for the retail marketplace. These devices typically receive newly harvested plant product, then process the plant product for cleaning and performing other processing prior to packaging the plant product for the retail marketplace. These devices comprise substantially large, robust pieces of machinery that may be wholly, or partially, automated.

The prior art washing devices usually include a plant product receiving area for receiving the newly harvested plant products and a processing assembly coupled to the receiving area. The processing assembly may include a washing assembly that consists of a plant product conveyance assembly containing circulating water for removing dirt, insecticides, and other undesired particulate matter from the plant products. A drying assembly may optionally be coupled to the washing assembly for drying the cleansed plant products prior to packing the plant product for distribution to retail marketplaces.

A number of such devices are disclosed in the prior art. For example, U.S. Pat. No. 2,467,888, to Harlow, discloses an apparatus for washing plant products. The disclosed apparatus includes a table structure mounted for rotation about an upright axis. The table structure comprises a produce supporting top adapted to retain the produce thereon. The top is coarsely apertured so that when water is sprayed at produce retained on the top, as the water detaches waste from the produce, the apertures are sufficiently large to enable removal of the waste from the table top. The apparatus includes water spraying means, means for rotating the table, and a pan that is configured to prevent exit of the waste through a water discharge outlet.

U.S. Pat. No. 3,683,945, to Weisser, is directed to a flood cell apparatus for conveying and processing materials for washing conveying, and processing vegetables and the like. The flood cell comprises an inclined tank that has a rounded bottom, a closed inlet end, and an open outlet end. The outlet end is upraised relative to the inlet end to define a flood level over which liquid introduced into the tank, leaves the tank. Nozzles direct streams of water under pressure from the inlet end of the tank toward the outlet end for impelling vegetables toward the outlet end. The nozzles create turbulence in the water for cleaning the vegetables. Waste material is detached from the vegetables and moves toward the inlet end where a waste outlet is provided for removing the waste, while the vegetables are moving toward the outlet end of the apparatus.

Another device for washing produce is disclosed in U.S. Pat. No. 5,413,131, to Medlock. The disclosed washer includes an elongated open top tank that contains water. The tank has a loading end and an opposing exit end. A plurality of outlet nozzles are positioned transversely across the tank and are spaced along the full length thereof above the water line. A plurality of baffles are positioned in the tank in a staggered arrangement. The nozzles and baffles, along with the water in the tank, coact to draw produce loaded into the tank completely underwater. The produce is moved in an agitating serpentine pattern as it is moved toward the exit end of the tank.

U.S. Pat. No. 3,447,544, to De Vergara, is directed to an apparatus for washing and drying of fruit. The apparatus causes fruit to pass through a series of water baths under the influence of water pressure, under a rinsing spray, and finally between jets of air for drying the fruit.

U.S. Pat. No. 5,097,755, to Hill, discloses a method and apparatus for processing produce, and particularly fresh vegetables for salads. The disclosed apparatus includes a cleaning assembly the includes high pressure nozzles that spray chlorinated water at a desired storage temperature of the vegetables.

U.S. Pat. No. 2,666,711, to Crosset, discloses a method and apparatus for processing leafy vegetables, and particularly for drying leafy vegetables such as spinach. U.S. Pat. No. 4,549,478, to Entes, is directed to an apparatus for washing slices of a tuberous plant, such as potatoes. U.S. Pat. No. 3,918,116, to Valdespino, is directed to a food lift and U.S. Pat. No. 4,509,545, to Trotter, discloses a portable washing and spray assembly.

However, the various methods and apparatus of the prior art suffer from a number of disadvantages. One disadvantage common to the above enumerated prior art references, and specifically those apparatus directed toward cleaning leafy vegetables, is that they are not well suited for cleaning substantially large volumes of the leafy vegetables. Often, as these vegetables are being conveyed along the washing portion of the apparatus, the leafy vegetables collect and clog the washing portion of the apparatus. Operators are needed for monitoring and removing these clogs, which adds to the cost associated with processing of the vegetables.

Another disadvantage found in the prior art, is that as the plant product is conveyed along the washing portion of the apparatus, the plant product is often not completely submerged or not submerged for a sufficient time period. This usually results in the plant product not being adequately cleaned.

A further disadvantage of the prior art is, that the water spray nozzles spray water for cleaning of the vegetables under excessive pressure. This often causes the water to contact the plant product with enough force to damage the leaves of the plant products. Additionally disadvantageous of the prior art, is that it is often time consuming to drain and fill the water circulating through the plant product washing portion of the apparatus. This may cause operators of the apparatus to not replace the water at proper intervals, such as when the water becomes excessively dirty, resulting in the plant product passing through the washing portion, and again not being sufficiently cleaned. Another disadvantage is, that these industrial washing apparatuses are excessively large and consume unnecessary quantities of workspace.

Another known disadvantage common to the prior art industrial processing apparatus is, that each industrial washing apparatus is configured for cleaning only a particular food product or very similar food products. For example, a prior industrial apparatus configured for washing tuberous plants, such as potatoes, is not suited for industrial washing of dissimilar plant products, such as leafy vegetables. If a user were to attempt cleaning of leafy vegetables, is such a configured apparatus, damage to the vegetables and insufficient cleaning thereof may result.

Thus, there exists a need for an improved apparatus for industrial washing of foodstuffs that is capable of sufficiently cleaning large volumes several different types of foodstuffs.

OBJECTS OF THE INVENTION

It is therefore an object of the present invention to provide an improved apparatus for industrial washing of several different types of foodstuffs;

It is another object of the present invention to provide an improved apparatus for industrial washing of several different types of foodstuffs that is configured to facilitate fluid flow therethrough to inhibit clogging of foodstuffs passing therethrough for sufficiently cleaning large volumes and for maintaining sanitation thereof;

It is a further object of the present invention to provide an improved apparatus for industrial washing of several different types of foodstuffs that completely submerges the foodstuffs passing therethrough for a sufficient time period to clean the foodstuffs;

It is still another object of the present invention to provide an improved apparatus for industrial washing of several different types of foodstuffs that removes unwanted particulate matter from the foodstuffs without causing harm thereto;

It is yet a further object of the present invention to provide an improved apparatus for industrial washing of several different types of foodstuffs that is well suited for processing large volumes of foodstuffs;

It is another object of the present invention to provide an improved apparatus for industrial washing of several different types of foodstuffs that efficiently utilizes the water circulating therethrough;

It is a still further object of the present invention to provide an improved apparatus for industrial washing of several different types of foodstuffs that is capable of industrial washing of several different types of foodstuffs without re-configuration thereof; It is yet another object of the present invention to provide an improved apparatus for industrial washing of several different types of foodstuffs that is substantially compact for efficiently utilizing workspace; and It is a further object of the present invention to provide an improved apparatus for industrial washing of several different types of foodstuffs that facilitates quick replacement of water circulating therethrough.

SUMMARY OF THE INVENTION

These and other objects and advantages of the present invention are achieved by providing an improved apparatus for industrial washing of a number of different types of foodstuffs. The apparatus of the present invention efficiently utilizes hydro-energy for sufficiently cleaning various types of foodstuffs ranging from plant products, such as leafy vegetables for example, to fish, such as sardines, and other similar foodstuffs, processed by the invented apparatus, while effectively using water circulating therethrough.

In the preferred embodiment, the apparatus of the present invention comprises a product loading assembly coupled to a cleansing flume that is coupled to an overflow assembly. The loading assembly comprises a conical receiving section having a plurality of spray nozzles located about its inner periphery and adjacent to an outer edge thereof. Each of the spray nozzles in the receiving section coact to form a dense and low pressure shower in a center region thereof that flows through the loading assembly for completely submerging product disposed in the receiving section to form a product slurry. Additionally, the nozzles are configured to extend somewhat flush with the inner periphery of the receiving section. The configuration of the nozzles and conical receiving section coact to develop the dense, low pressure shower for forming the slurry without subjecting the foodstuffs to excessive water pressure, which could cause damage thereto. The conical configuration of the receiving section along with the low pressure shower formed in the center region reduces the speed of the water streams output by the nozzles to dissipate the energy of the water. The conical configuration of the receiving section further prevents damage to the foodstuffs, due to the foodstuffs contacting non-curvilinear surfaces.

The water-product slurry produced in the receiving section ensures that a maximum amount of product mixes with the water to form a slurry that optimizes water usage and quickly cleans and chills, if it is desired to chill, the foodstuffs being processed by the invented washing apparatus. The flow rate of the water flowing through the spray nozzles is adjustable for maximizing product-water mixture when forming the slurry. The flow rate of water circulating through the invented apparatus ranges from 50 to 2,000 gallons per minute (GPM), with a preferred flow rate ranging between approximately 300 to 600 GPM, for a 16 inch diameter flume.

The loading assembly of the invented industrial washing apparatus further includes a transitional section made integral with the receiving section for coupling the loading assembly to the cleansing flume. The transitional section is configured to optimize fluid flow, and thus the product slurry flowing therethrough. Preferably, the transitional section conical in cross-sectional configuration for tapering the diameter of the loading assembly from a wide opening of the receiving section down to the diameter of the flume. The transitional section is arcuate along its length for coupling the receiving section to the cleansing flume, which is generally horizontal, and may have a slight downward inclination along its length. The conical cross-sectional configuration of the transitional section, along with the configuration of the receiving section, promotes maximum flow of the slurry through the loading assembly to prevent clogging of the slurry and provide fast foodstuff processing rates. The configuration of the transitional section further inhibits collection of debris and unwanted particulate matter in the loading assembly, by means of gravity and water flow coacting to reduce a large foodstuff mass to a slurry dimensioned to be processed by the cleansing flume. The conical configuration of the transitional section further aids with maintaining sanitation of the invented apparatus, since the collection of dirt and debris in corners and crevices is obviated.

In the preferred embodiment a water distribution manifold is coupled to a water source and to the spray nozzles for controlling the flow rate of water output by the nozzles. Most preferably, the manifold is configured with a flow control valve for each group of spray nozzles for controlling the flow rate of water output by the nozzles to prevent damage to the product disposed in the loading assembly, while maintaining optimal mixture of the product and water for forming the slurry. The manifold is positioned about the periphery of the transitional section for performing maintenance on the manifold. The manifold comprises a simplistic design so that sanitation and other maintenance procedures can be performed thereon without an operator having to perform a number of complicated tasks and without the use of tools. For example, the sanitation valves thereof can be disassembled and services may be performed thereon by hand.

The cleansing flume of the preferred embodiment of the present invention is configured to maintain product flowing therethrough substantially completely submerged for effectively cleaning the foodstuffs passing therethrough. Preferably, the cleansing flume has a generally cylindrical cross-sectional configuration to aid fluid flow therethrough to inhibit the slurry from collecting therein and clog the invented apparatus. The cylindrical cross-sectional configuration of the flume additionally prevents the collection of dirt and debris in comers and crevices, as with the prior art, to maintain sanitation thereof.

The flume preferably has an open top side to allow access to the interior thereof. The open top side is narrow enough to inhibit water passing through the flume from spilling, while being sufficiently wide to allow access to the interior thereof. Additionally, upwardly projecting side walls may be positioned along each side edge of the open top side to further inhibit water from spilling. This enables the flume to control greater amounts of water passing therethrough so that the flow rate of water circulating through the flume can be increased, and thus the amount of product continuously disposed in the loading assembly can be increased, for increasing the processing rate of the invented industrial washing apparatus.

A lid may be provided for enclosing the open top side of the flume. The lid is preferably configured complementary to the side walls and periphery of the flume. For example, in the preferred embodiment, the lid is provided with an arcuate bottom wall and outwardly extending sides that are configured to mate with the side walls of the open top side. When the lid is placed over the open top side, no water can spill or splash out of the open top side, so that the flume can be substantially filled with water for enabling greater amounts of product to be disposed in the loading assembly, for substantially increasing process rates of the invented apparatus.

A plurality of spray nozzles are spatially positioned along each side of the cleansing flume to form opposing pairs of nozzles. The nozzles are oriented along the length of the flume, such that each nozzle sprays a stream of water that is projected upwardly along the curvilinear side walls of the flume and cascades towards the center thereof, forming opposing streams of water. The cascading portions of the streams of water conflux to form a dense shower. The configuration of the nozzles and curved side walls of the flume sufficiently dissipate the energy of the streams of water so that foodstuffs passing through the flume are not damaged by the force of the water. The shower of water rains down on the product slurry passing through the flume with sufficient force to propel product beneath the surface of water passing through the flume for performing a number of beneficial functions.

Firstly, the shower propels product in the slurry beneath the surface of water to break apart the product and ensure that the product is adequately cleaned, without damaging the product. Secondly, the opposing streams of water output from each of the pairs of nozzles and the showers formed thereby creates and maintains a turbulent fluid flow of fluid passing through the flume, and particularly causes the product slurry to flow through the flume in a turbulent manner. The turbulence of the slurry facilitates removal of unwanted particulate matter from foodstuffs comprising the slurry, resulting in quickly and efficiently cleaning the product. Thus, as the product slurry flows through the flume, foodstuffs comprising the slurry are substantially completely submerged, while being sufficiently agitated to clean the foodstuffs, without causing damage thereto. The shower also aids with cleaning product, particularly those portions of product that may extend above the surface of the water as they are passing along the length of the flume. The turbulence of the slurry, along with the cross-sectional configuration of the flume, further prevents the product slurry from collecting in the flume and clogging. Therefore, the need for operators monitoring the flume is obviated. Additionally, water flowing to the spray nozzles may be aerated to further aid with removing waste matter from the plant product for cleaning.

An elongated drain means is provided along the length of the cleansing flume or each semi-cylindrical member of the secondary flume, when provided. The drain means is affixed to a bottom surface of the flume for receiving particulate matter, such as dirt and grime, as it is removed from foodstuffs passing along the flume. A screen is preferably disposed over an opening to the drain means to prevent foodstuffs from inadvertently entering the drain means, while allowing particulate matter to pass therethrough. The drain means includes actuation means for removing particulate matter from the drain. The actuation means is actuated to force particulate matter out of the drain means and into a receptacle, for enabling the drain to receive further particulate matter. Further, the actuation means is preferably configured to allow actuation thereof while the product slurry is passing through the flume, so that maintenance may be performed on the drain means without interruption to foodstuffs being processed by the invented washing apparatus for maintaining the product processing rates.

The cleansing flume may optionally be provided with baffles or flow diverters that are positioned along a bottom surface thereof. The baffles are affixed to the bottom surface so that they extend across the bottom surface transverse to a longitudinal axis of the flume for aiding with maintaining the turbulence of the slurry passing through the flume. The baffles are oriented in the flume and configured to inhibit damage from coming to foodstuffs comprising the slurry, such as leafy plant products including spinach, for example. A top edge of each of the baffles is configured to prevent damage from coming to product when the product contacts the baffles.

In the preferred embodiment, the overflow assembly is coupled to an outlet end of the cleansing flume for maintaining the water level therein. The overflow assembly has a conical inlet portion coupled to the outlet end of the flume and a splayed output portion. The inlet portion is affixed to the periphery of the outlet end of the flume for receiving the slurry therefrom. One or more spray nozzles may optionally be located about the inner periphery of the inlet portion of the overflow assembly to perform final rinsing of product in the slurry. The overflow assembly additionally prepares the product for de-watering by known devices.

The splayed output portion is configured to prepare product for transference to subsequent processing means, such as a de-watering device, that can comprise a conveyor belt or similar well known de-watering means. The output portion is splayed for distributing product, from a somewhat narrow mass as the product is exiting the flume, to a somewhat wide mass for transference to a similarly dimensioned de-watering means. The output portion includes an upwardly extending bottom wall that terminates in a downwardly projecting lip. The bottom wall extends upwardly to maintain the water level in the flume, while the lip prevents damage from coming to the product as the product is transferred to the de-watering device.

Optionally, a secondary cleansing flume may be positioned for adjacent to the overflow assembly of the apparatus for receiving foodstuffs therefrom for performing further treating and cleaning of the foodstuffs. The secondary flume preferably comprises a plurality of semi-cylindrical members interconnected with connecting portions. The connecting portions preferably comprise arcuate elbow tubing, having a cylindrical cross-sectional configuration, that is configured to interconnect adjacent members while maintaining the flow rate of the slurry passing through the flume. The connecting portions range from 1 degree to 180 degrees in curvature, so that interconnected members of the secondary flume can extend at any desired angle relative to one another, depending upon the desired path of the flume.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventor of carrying his invention. Various modifications, however, will remain readily apparent to those skilled in the art, since the generic principles of the present invention have been defined herein.

Figure 1:
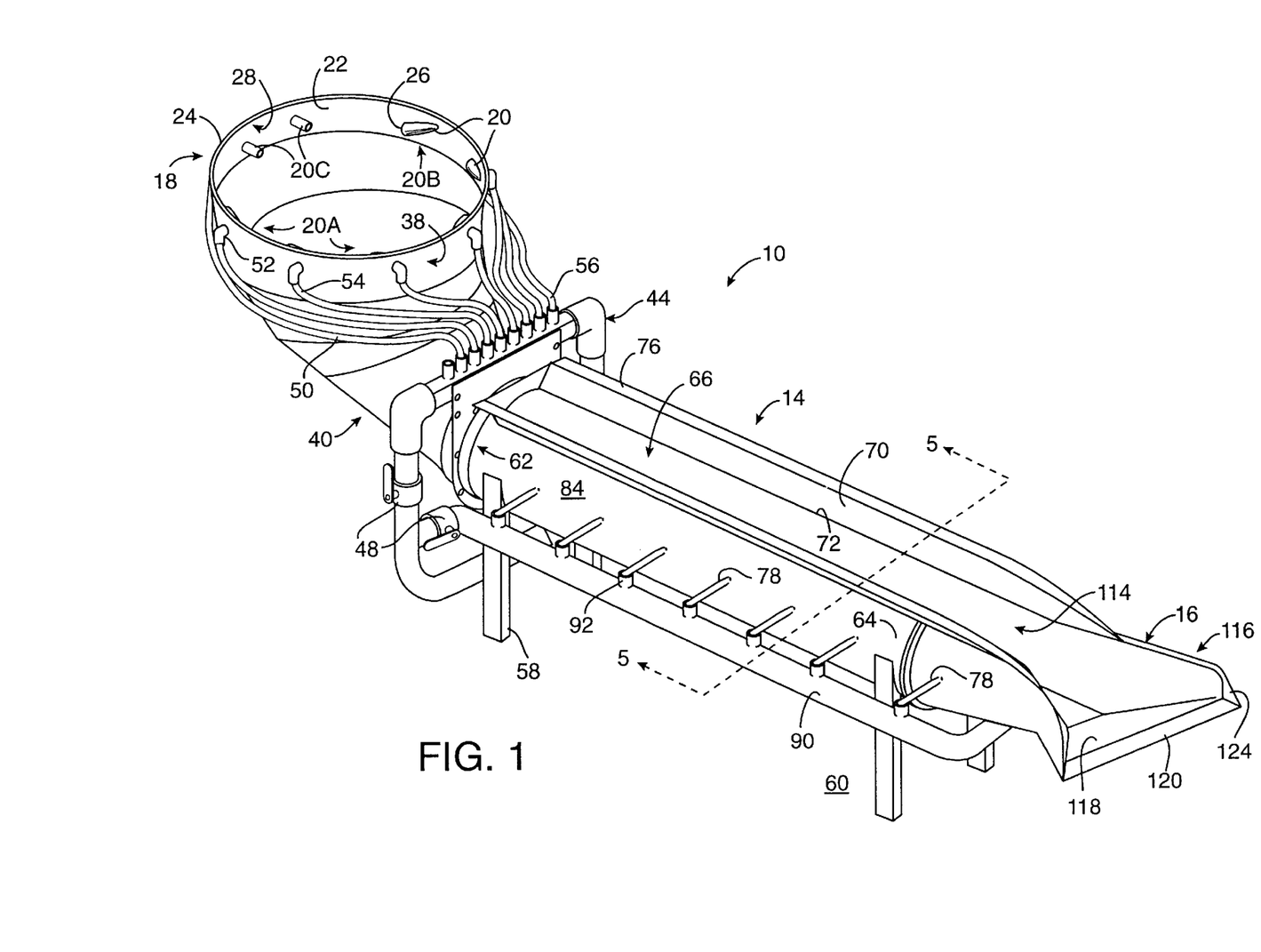
FIG. 1 is a perspective view showing a preferred embodiment of an improved apparatus for industrial washing of a number of different types of foodstuffs of the present invention.

Referring now to FIG. 1 of the drawings, there is shown generally at 10, a preferred embodiment of an improved apparatus for industrial washing of a number of different types of foodstuffs, constructed according to the principles of the present invention. The industrial washing apparatus 10 of the present invention is well suited for washing a number of different types of foodstuffs without modification thereto, ranging from various different plant products, such as leafy and tuberous plant products, to fish, such as sardines for example, and other similar foodstuffs. The apparatus 10 of the present invention is configured to efficiently utilize hydro-energy for sufficiently cleaning products processed thereby and to optimize usage of workspace occupied by the apparatus 10.

Referring now to the drawing FIGS. 1–5 and FIG. 7 of the drawings, in the preferred embodiment, the invented apparatus 10 comprises a product loading assembly 12 coupled to a cleansing flume 14 that is coupled to an overflow assembly 16. The configuration of the product loading assembly 12 and cleansing flume 14 enhances the ease with which fluid flows through the present invention 10. The present invention 10 is capable of circulating water flowing at a relatively high flow rate, without requiring a plurality of water pumping means, as was necessitated by prior art washing apparatus for circulating water therethrough. The loading assembly 12, cleansing flume 14, and overflow assembly 16, along with the components thereof, preferably comprise a suitable material that maintains the sanitary properties of the apparatus 10, while being sufficiently strong and durable. In the preferred embodiment the invented washing apparatus 10 preferably comprises appropriate metal alloys, such as stainless steel, aluminum alloy, or suitable polymers, such as polyvinyl chloride (PVC), for example, and desired combinations thereof.

Figure 2:
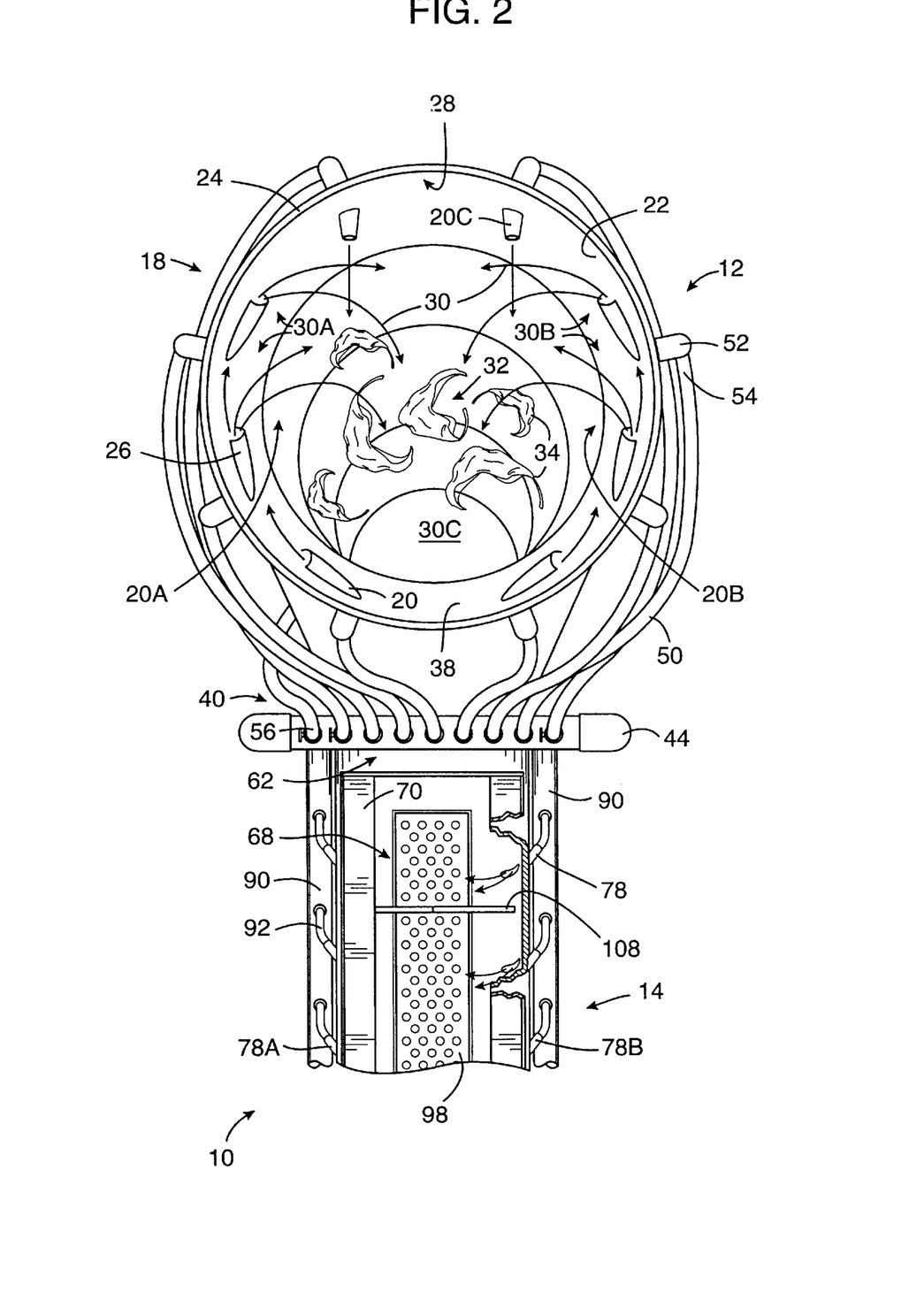
FIG. 2 is a top view, showing a loading assembly and a cleansing flume of the preferred embodiment, shown partially in cross-section.
Figure 3:
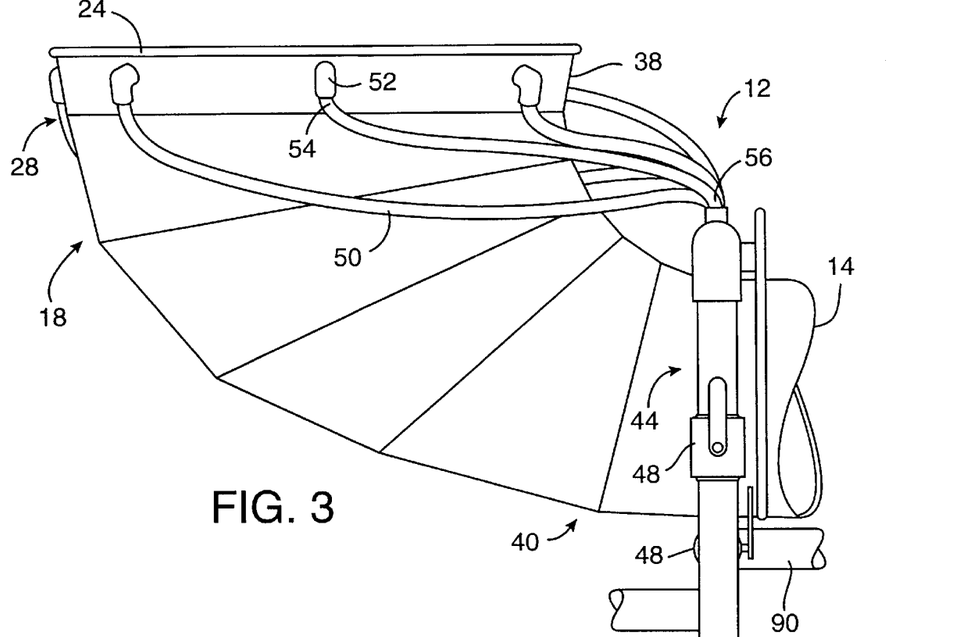
FIG. 3 is a side-elevational view showing the loading assembly of the present invention.

Referring now to FIGS. 1–3 of the drawings, the loading assembly 12 of the preferred embodiment comprises an open conical receiving section, shown generally at 18, that has a plurality of turbulence inducing spray nozzles 20 located about an inner periphery 22 thereof adjacent to a top edge 24. The open conical receiving section 18 is substantially wide, ranging from approximately 25 to 36 inches, and preferably approximately 34 inches, to enable large volumes of product to be continuously disposed therein.

Each of the turbulence inducing spray nozzles 20 is affixed to the inner periphery 22 of the receiving section 18 using well known means, such as welding for example. The turbulence nozzles 20 are generally parabolic along their length and may have a slightly less than hemispheric cross sectional dimension. The turbulence nozzles 20 are affixed to the receiving section 18 so that an outlet 26 of each nozzle 20 is oriented downwardly and rearwardly toward a back region 28 of the receiving section 18, enabling each nozzle 20 to output a stream of water 30 toward the back region 28. The turbulence nozzles 20 are affixed to the receiving section 18 such that they form an angle ranging from approximately 20 to approximately 60 with the top edge 24 of the receiving section 18.

The water streams 30 output from each of the turbulence nozzles 20 are projected along the inner periphery 22, and downwardly relative to the top edge 24, of the receiving section 18 toward the back region 28, such that a first triad 20A of turbulence nozzles 20 is positioned to induce a counterclockwise fluid flow 30A in the receiving section 18 and a second triad 20B of turbulence nozzles 20 is positioned to induce a clockwise fluid flow 30B. As the opposing water streams 30A, 30B are projected toward the back region 28, a portion of each of the water streams cascades towards a center region 32 of the receiving section 18, with the cascading portion increasing as the opposing water streams 30A, 30B approach the back region 28. The cascading portions of the water streams 30A, 30B conflux to form a dense shower 30C that causes a turbulent fluid flow through the conical loading assembly 12. The conical configuration of the receiving section 18 along with the low pressure shower formed in the center region 32 reduces the speed of the water streams 30A, 30B output by the nozzles 20 to dissipate the energy of the water 30. The conical configuration of the receiving section 18 further prevents damage to the foodstuffs, due to the foodstuffs contacting non-curvilinear surfaces.

The dense shower 30C created by the turbulence nozzles 20 quickly completely submerges foodstuffs, or product 34 disposed in the receiving section 18 to form a product slurry, shown generally at 36 (shown in FIG. 5), comprising the foodstuffs 34 and water 30 output by the nozzles 20. The product slurry 36 produced in the receiving section ensures that a maximum amount of product 34 mixes with the water 30 to form a slurry 36 that optimizes water usage and quickly cleans and chills, if it is desired to chill, the product 34. The configuration and orientation of the turbulence nozzles 20, which causes the opposing streams of water 30A, 30B to extend about the receiving section's inner periphery 22, sufficiently dissipates the water force passing through the flume 14 to ensure that foodstuffs 34 passing through the loading assembly 12 are not damaged by the force of the water 30.

At least one inwardly projecting spray nozzle 20C is positioned on the inner periphery 22 of the back region 28 of the receiving section 18. The inwardly projecting spray nozzles 20C output streams of water 30D to enhance the formation of the shower 30C and thus, the turbulent fluid flow in the loading assembly 12. The spray nozzles 20C further increase the amount of water 30 being disposed into the receiving section 18, to aid with quickly and completely submerging product 34 disposed in the receiving section 18 to form the slurry 36.

The flow rate of water 30 flowing through the spray nozzles 20, and throughout the apparatus 10 and thus, the cleansing flume 14, is adjustable for maximizing product-water mixture when forming the slurry 36, while not damaging the product 34 due to excessive water pressure. The flow rate of water circulating through the invented apparatus 10 can range from 50 to 2,000 gallons per minute (GPM) depending upon various factors including the diameter of the flume 14, output rate of a pump 37 coupled to the invented apparatus 10, and type of product being processed thereby. Preferably, the flow rate ranges between approximately 300 to 600 GPM for a flume 14 having a 16 inch diameter.

The loading assembly 12 of the invented washing apparatus 10 further includes a transitional section, shown generally at 40, made integral with the receiving section 18, for coupling the loading assembly 12 to the cleansing flume 14. The transitional section 40 is configured to optimize fluid flow, and thus the slurry 36 flowing therethrough. Preferably, the transitional section 40 is conical in cross-sectional configuration, for mating with the receiving section 18 and for tapering the diameter of the receiving section 18, down to the selected diameter of the flume 14.

The transitional section 40 is arcuate along its length for coupling the receiving section 18 to the cleansing flume 14. The conical cross-sectional configuration of the transitional section 40, along with the configuration of the receiving section 18, promotes maximum flow of the slurry 36 through the loading assembly 12 to prevent clogging of the slurry 36 and provide fast foodstuff processing rates. The configuration of the transitional section 40 further inhibits collection of debris and unwanted particulate matter in the loading assembly 14, by means of gravity and water flow coacting to reduce a large foodstuff mass to a slurry 36 dimensioned to be processed by the cleansing flume 14. The conical configuration of the transitional section 40 further aids with maintaining sanitation of the invented apparatus 10, since the collection of dirt and debris in comers and crevices is obviated. Thus, the configuration of the transitional section 40 further increases product processing rates by enabling large volumes of product 34 to be continuously disposed in the loading assembly 12.

Referring to FIGS. 1–4 and FIG. 7, in the preferred embodiment 10, a water distribution manifold 44 is positioned about the periphery of the apparatus 10 and proximal to the transitional section 40. The manifold 44 is coupled to a water source 46 and to the spray nozzles 20, 20C for controlling the flow rate of water output thereby. Preferably, the manifold 44 is configured with a flow control valve 48 for each group of spray nozzles 20, 20C for controlling the flow rate of water 30 output by the nozzles 20, 20C to prevent damage to product 34 disposed in the loading assembly 12, while maintaining optimal product-water mixture of the slurry 36. The manifold 44 comprises a simplistic design so that sanitation and other maintenance procedures can be performed thereon without an operator having to perform a number of complicated tasks and without the use of tools. For example, the sanitation valves 48 thereof can be disassembled and maintenance procedures can be performed thereon by hand.

Figure 7:
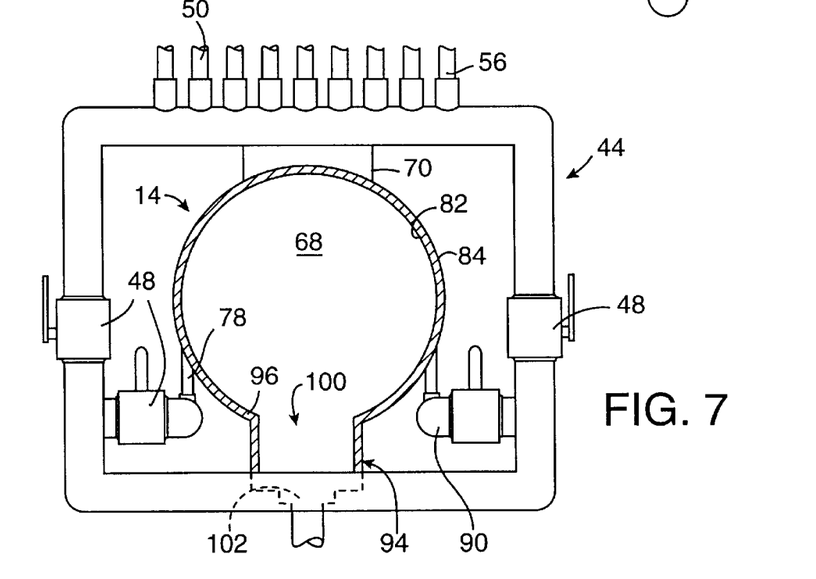
FIG. 7 is a cross-section, side elevational view showing a water distribution manifold of the preferred embodiment of the invented industrial washing apparatus of the present invention.

A plurality of pliant plant tubes 50, which may comprise a known commercially available polymeric high pressure tubing, extend between the manifold 44 and each of the nozzles 20, 20C for outputting water from the water source 46, via the manifold 44, to the nozzles 20, 20C. A plurality of fittings 52, which may comprise known elbow fittings such as 45 or 90 degree fittings for example, are connected to an end 54 of each tube 50 and are affixed to the outer periphery of the receiving section 18 using known means such as welding or threading. A second end 56 of each tube 50 is coupled to the manifold 44. A flow control valve 48 optionally may be interposed between the second end 56 of each tube 50 and manifold 44, for controlling the flow rate of water streams output by selected nozzles 20, 20C. The tubes 50 preferably comprise pliant tubing to ensure routing thereof between the manifold 44 and loading assembly 12 and to aid with removing the manifold 44 from the apparatus 10, for example.

Referring to FIGS. 1–2 and FIGS. 4–6, the cleansing flume 14 of the preferred embodiment of the present invention 10 is configured to maintain product 34 in the product-water slurry 36, flowing therethrough substantially completely submerged for effectively cleaning the product 34. Preferably, the cleansing flume 14 is substantially elongated and has a generally cylindrical cross-sectional configuration that aids fluid flow therethrough to inhibit the slurry 36 from collecting therein and clog the invented apparatus 10. The cylindrical cross-sectional sectional configuration of the flume 14 additionally prevents the collection of dirt and debris in corners and crevices to maintain sanitation thereof. Upright support members 58 may be affixed to the outer periphery of the flume 14 for supporting the flume 14 above a ground surface 60.

An inlet end 62 of the flume 14 is coupled to the transitional section 40 for coupling the flume 14 to the loading assembly 12, while an outlet end 64 is coupled to the overflow assembly 16, thus providing a product cleansing path from the loading assembly 12 to the overflow assembly 16. The flume 14 is preferably configured with an open top side 66 to allow access to an interior 68 thereof. Preferably, the open top side 66 is configured sufficiently narrow to inhibit water 30 passing therethrough from spilling, while being just sufficiently wide to allow access to the interior 68.

Figure 5:
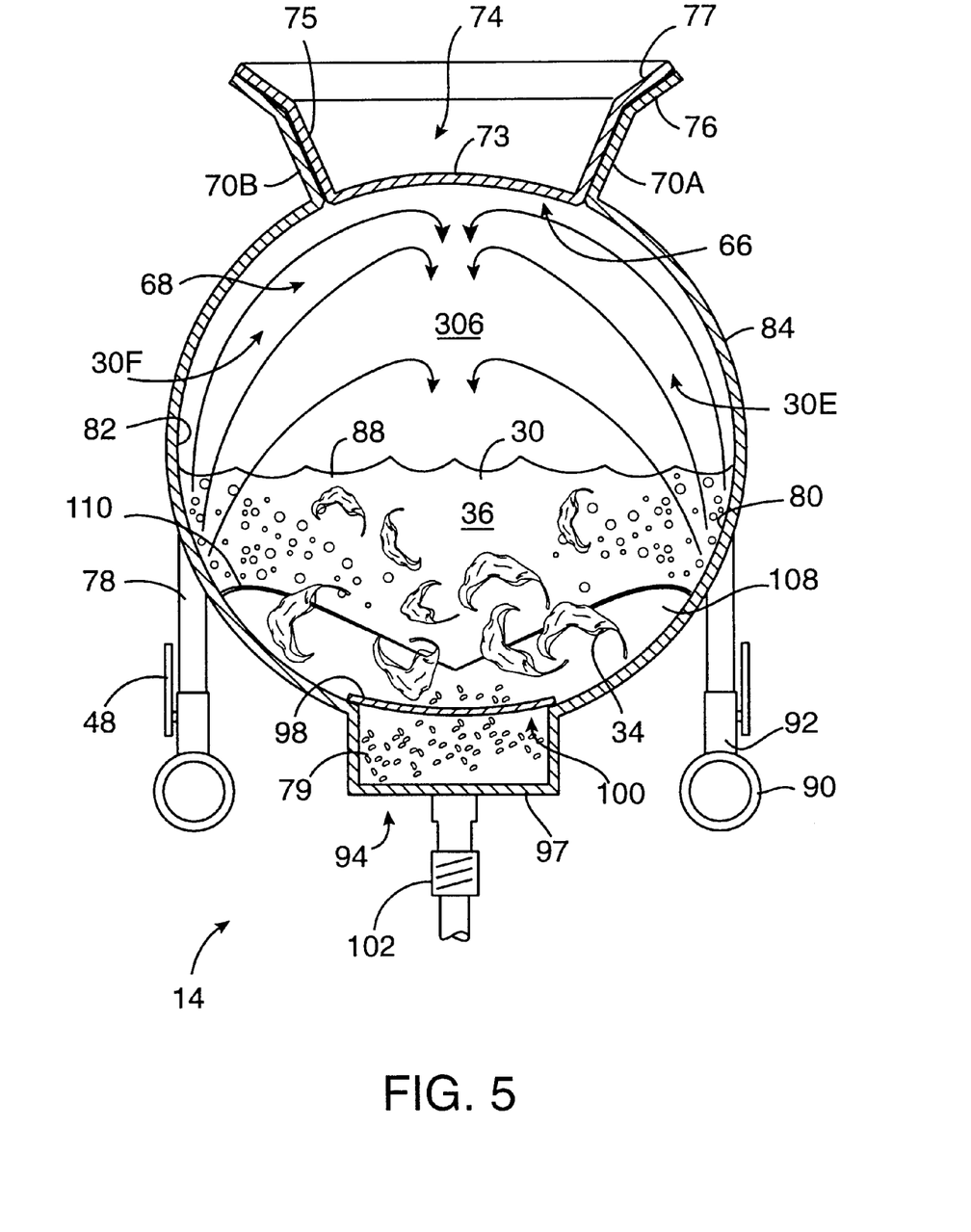
FIG. 5 is a cross-sectional view showing the cleansing flume of the present invention taken along lines 5—5 of FIG. 1.

Additionally, an upwardly projecting side wall 70 is affixed to each side edge 72 of the open top side 66. The side walls 70 further inhibit water 30 from spilling from, or splashing out of, the flume 14, to enable the flume 14 to pass greater amounts of water 30 passing therethrough so that the flow rate of water 30 circulating through the flume 14 can be increased, and thus the amount of product continuously disposed in the loading assembly can be increased, for increasing the processing rate of the invented industrial washing apparatus 10.

Optionally, a lid 74 (shown in FIG. 5) may be provided for enclosing the open top side 66. Preferably, the lid 74 is configured complementary to the side walls 70, inclined flanges 76 thereof, and periphery of the flume 14. For example, in the preferred embodiment, the lid 74 is provided with an arcuate bottom wall 73 and outwardly extending sides 75 that terminate in oblique end portions 77 that are configured to mate with the incline flanges 76 of the side walls 70. The lid's arcuate bottom wall 73 has a curvature complementary to the curvature of the flume 14, to form a substantially cylindrical tube when the lid 74 is coupled to the flume 14. When the lid 74 is placed over the open top side 66, no water 30 can spill or splash out of the open top side 66, so that the flume 14 can be substantially filled with water 30 for enabling greater amounts of product 34 to be disposed in the loading assembly 12 for substantially increasing the flow rate of the slurry 36 through the flume 14, for greatly increasing process rates of the invented apparatus 10.

A plurality of spray nozzles 78 are spatially positioned along each side of the cleansing flume 14. The spray nozzles 78 are positioned along the flume 14, such that opposing pairs of nozzles 78A, 78B (best shown in FIG. 2) are formed. The nozzles 78 are affixed to the periphery of the flume 14, such that they extend at an inclined angle to a longitudinal axis L of the flume 14. Preferably, the nozzles 78 are positioned at an obtuse angle to the longitudinal axis L of the flume 14 and relative to the inlet end 62 of the flume 14. The nozzles 78 preferably comprise portions of a suitable rigid, durable material, such as polyvinyl chloride (PVC) tubing or aluminum, for example. Ends 80 of the nozzles 78 are configured with an arcuate configuration, so that the ends 80 extend flush with an inner periphery 82 of curvilinear side walls 84 of the flume 14. The nozzle's ends 80 extend flush with the side wall's inner periphery 82 so that product 34 flowing through the flume 14 is not contacted by any portion of the nozzle 78, which could damage the product 34, and could cause clogging of the flume 14.

The nozzles 78 are angled along the flume 14, so that opposing streams of water 30E, 30F output therefrom are projected upwardly along the inner periphery 82 of the curvilinear side walls 84 of the flume 14 and slightly forwardly toward the overflow assembly 16. As the water streams 30E, 30F sprayed from each nozzle 78 pass a centerline of the flume, a portion of the water streams 30E, 30F begins falling inwardly toward a center region 86 of the flume 14, with the portion of the water stream 30E, 30F falling inwardly toward the center region 86 increasing as the stream 30E, 30F approaches the open top side 66 thereof. Prior to the opposing water streams 30E, 30F reaching the top side 66, the entire stream of water 30E, 30F falls generally toward the center region 86 to aid and maintain the flow rate of the slurry 36 flowing through the tube.

The cascading portions of the streams of water 30E, 30F conflux about the center region 86 and form a dense shower, shown generally at 30G. The configuration of the nozzles 78 and arcuate side walls 78 of the flume 14, coact to sufficiently dissipate the energy of the water streams 30E, 30F so that product 34 passing through the flume 14 is not damaged by the force of the water 30E, 30F. The shower of water 30G rains down on the product slurry 36 passing through the flume 14 with sufficient force to propel product 34 beneath a surface 88 of the water 30 passing through the flume 14 for performing a number of beneficial functions.

Firstly, the shower 30G propels product 34 in the slurry 36 beneath the water's surface 88 to break apart the product 34 and ensure that the product 34 is adequately cleaned, without damaging the product 34. Secondly, the opposing streams of water 30E, 30F output from each of the pairs of nozzles 78A, 78B and the showers 30G formed thereby creates and maintains a turbulent fluid flow of the slurry 36, to cause the slurry 36 to flow through the flume 14 in a turbulent manner. The turbulence of the slurry 36 facilitates removal of unwanted particulate matter 79 from foodstuffs 34 comprising the slurry 36, resulting in quickly and efficiently cleaning the product 34. Thus, as the product slurry 36 flows through the flume 14, foodstuffs 34 are substantially completely submerged and sufficiently agitated to clean the foodstuffs 34, without causing damage thereto.

The shower 30G also aids with cleaning product 34, particularly those portions of product 34 that may extend above the water's surface 88 as they are passing along the length of the flume 14. The turbulence of the slurry 36, along with the cross-sectional configuration of the flume 14, further prevents the product slurry 36 from collecting in the flume 14 and clogging. Therefore, the present invention 10 obviates the need for operators monitoring the flume 14. Additionally, water flowing to the spray nozzles 78 may be aerated to further aid with removing particulate matter 79 from the product 34 for cleaning.

One or more water supply lines 90 are coupled to the nozzles 78 and to the water source 46, for supplying water 30 to the flume 14. The water distribution manifold 44 may be interposed between the supply lines 90 and water source 46 for controlling the flow rate of water 30 flowing to the nozzles 78. A plurality of inlet tubes 92 are disposed along the length of the supply lines 92 and coupled to each nozzle 78, for coupling the supply lines 90 to the nozzles 78. The supply lines 90 are preferably interconnected to maintain the water pressure therein. Optionally, flow control valves 48 may be positioned between selected nozzles 78 and the supply line 90 for selecting the flow rate of water streams 30E, 30F output by individual nozzles 78.

Figure 4:
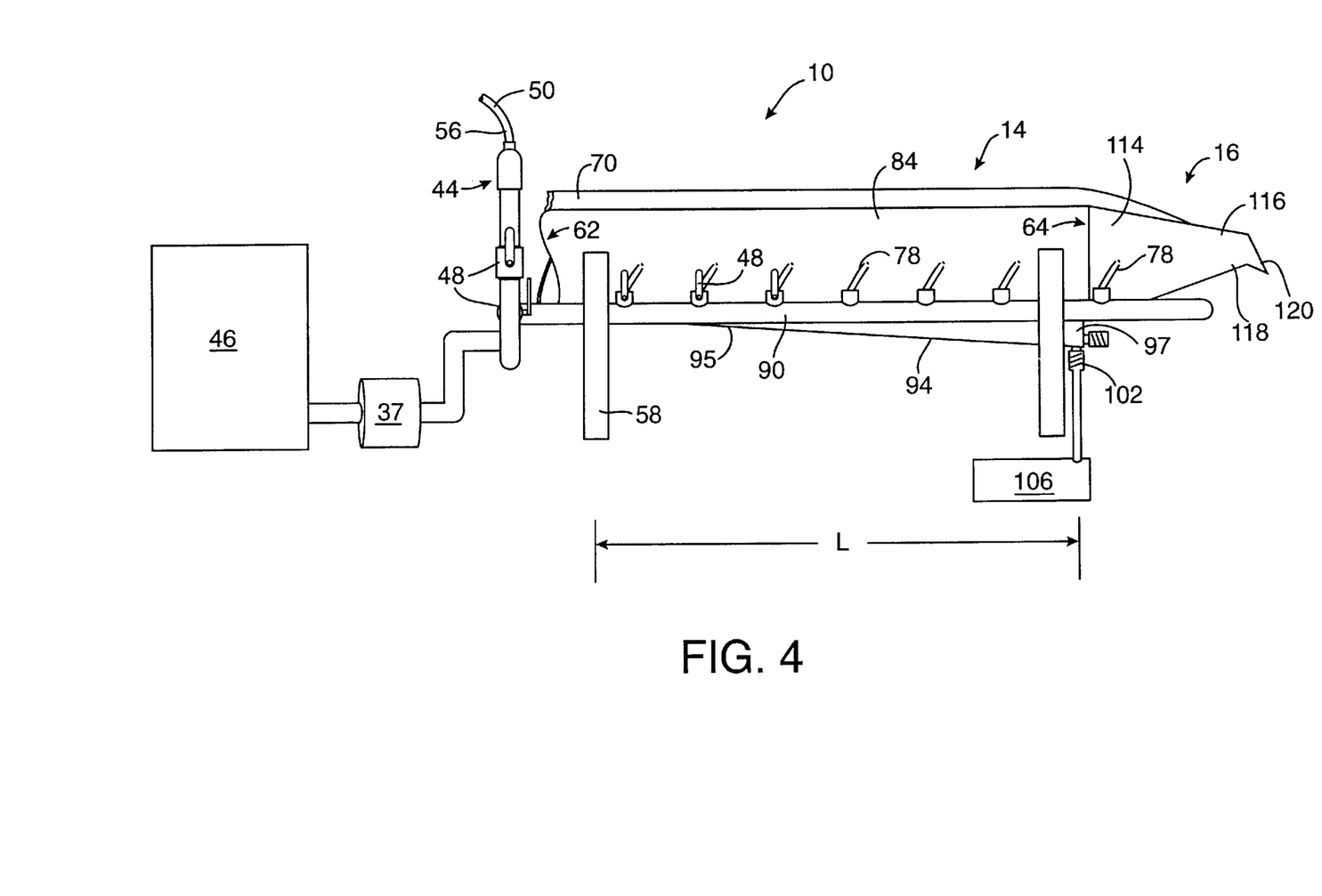
FIG. 4 is a side-elevational view showing the cleansing flume of the preferred embodiment.

Referring to FIG. 4 and FIG. 5 of the drawings, an elongated drain means 94 is provided along the length of the cleansing flume 14 or each semi-cylindrical member (to be discussed hereinafter) comprising the flume 14. The drain means 94 is affixed to a bottom surface 96 of the flume 14 for receiving particulate matter 79, such as dirt and grime, as it is removed from foodstuffs 34 passing through the flume 14. A screen 98 is preferably positioned over an opening 100 in the bottom surface 96 of the flume. The screen 98 may comprise any commercially available screen having a suitable mesh that prevents foodstuffs 34 from inadvertently entering the opening 100, and thus the drain means 94, while allowing particulate matter 79 to pass therethrough.

In the preferred embodiment, the drain means 94 comprises an elongated, generally rectangular member that extends substantially the length of the flume 14. The drain 94 may be of any appropriate width, so long as it is sufficiently wide to receive particulate matter 79 and water 30 passing into the flume's opening 100. Additionally, the drain 94 is tapered along its length, such that the drain 94 tapers from a substantially shallow end 95 adjacent to the loading assembly 12, to a substantially deep end 97 adjacent to the overflow assembly 16. Preferably, the drain 94 tapers in depth from approximately 2 inches or less at the shallow end 95 to approximately 8 inches at the deep end 97. The tapered configuration of the drain 94 facilitates removal particulate matter 79 therefrom by means of gravity and the force of water 30 flowing therethrough.

An actuation means 102 is coupled to the deep end 97 of the drain 94 and actuated to force particulate matter 79 out of the drain 94 and into a receptacle 106, for enabling the drain 94 to receive further particulate matter 79. Further, the actuation means 102 is preferably configured to allow actuation thereof, while the product slurry 36 is passing through the flume 14, so that maintenance may be performed on the drain means 94, and thus the invented washing device 10, without interruption to foodstuffs 34 being processed by the invented apparatus 10, for maintaining the product processing rates thereof. The actuation means 102 may comprise any one of several well known actuation means that may be controller either manually or automatically. For example, actuation means 102 may comprise an automatically controlled ball valve or other well known valve means. Additionally, the receptacle 106 may comprise any suitable device for receiving dirty water from the drain 94, such as a sewer system or further plumbing configured for cleaning and recycling the water 30 through the apparatus 10, for example.

The cleansing flume 14 may optionally be provided with baffles or flow diverters 108 that are positioned along the bottom surface 96 thereof. The baffles 108 are affixed to the bottom surface 96 so that they transverse the surface 96 and opening 100 for aiding with maintaining the turbulence of the slurry 36. The baffles 108 are oriented in the flume 14 at an acute angle relative to the longitudinal axis L thereof for inhibiting damage from coming to foodstuffs 34 comprising the slurry 36, such as leafy plant products including spinach, for example. A top edge 110 of each of the baffles 108 is configured to prevent damage from coming to the product 34 when the product 34 contacts the baffles 108.

Referring again to FIG. 1 and FIG. 4, in the preferred embodiment, the overflow assembly 16 is coupled to the outlet end 64 of the cleansing flume 14 for maintaining the water level therein. The overflow assembly 16 has a conical inlet portion 114 coupled to the flume's outlet end 64 and a splayed output portion 116. The inlet portion 114 is affixed to the periphery of the outlet end 64 for receiving the slurry 36. One or more spray nozzles 78 may optionally be located about the periphery of the inlet portion 114 to perform final rinsing of product 34 in the slurry 36. The overflow assembly 16 additionally prepares the product 34 for de-watering by known devices.

The splayed output portion 116 is configured to prepare product 34 for transference to subsequent processing means (not shown), such as a de-watering device, that can comprise a conveyor belt or similar well known de-watering means. The output portion 116 is splayed so that the diameter thereof is substantially greater than the diameter of the flume 14. This enables distributing of the product 34 across the width of an upwardly extending bottom wall 118 of the output portion 116, for transforming the product 34 from a somewhat narrow mass as the product 34 is exiting the flume 14, to a somewhat wide mass for transference to a similarly dimensioned de-watering means to facilitate quick drying of the product 34.

The upwardly extending bottom wall 118 terminates in a downwardly projecting lip 120. The bottom wall 118 extends upwardly to maintain the water level in the flume 14, while the lip 120 prevents damage from coming to the product 34 as the product 34 is transferred to the de-watering device, to ensure that the product 34 is substantially evenly distributed across the width of the bottom wall 118 and transferred to the de-watering device.

Figure 6:
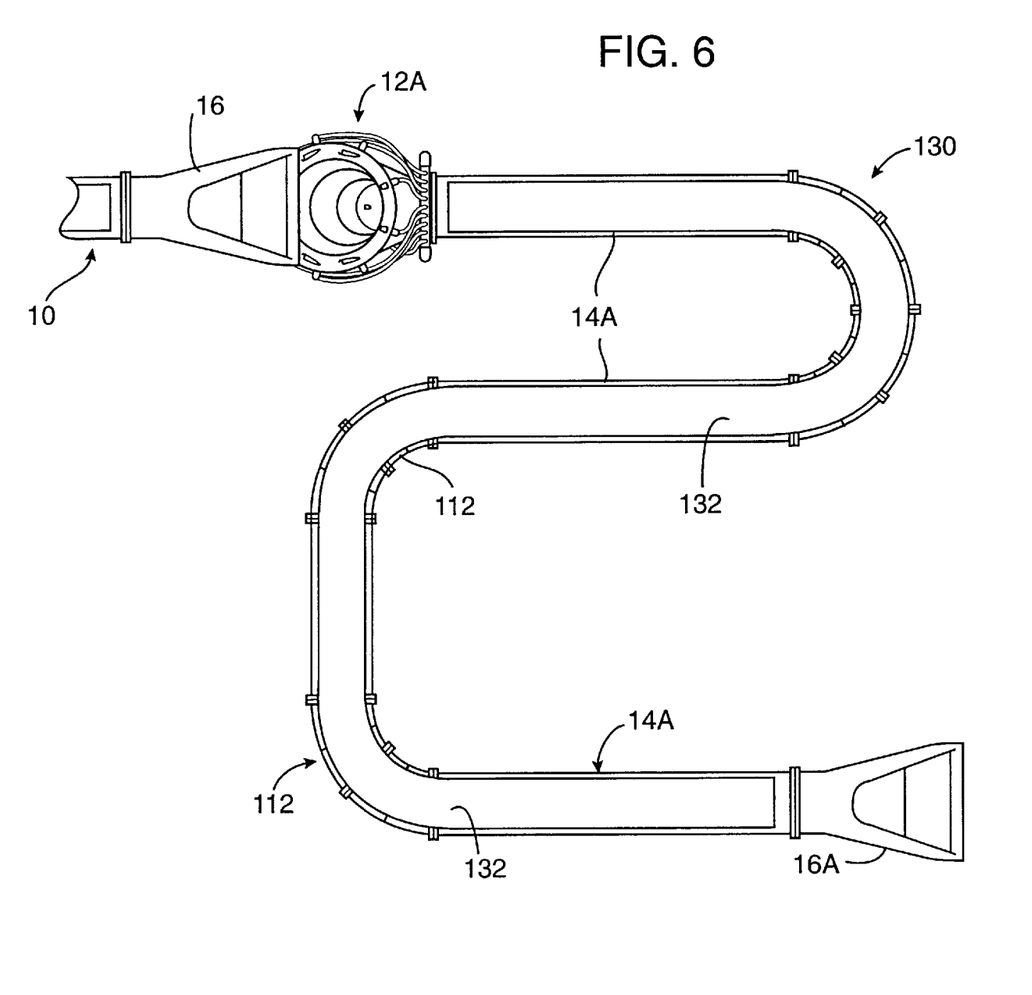
FIG. 6 is a plan view showing a secondary cleansing flume for receiving foodstuffs from the present invention for performing further processing thereon.

Referring particularly to FIG. 6 of the drawings, optionally the apparatus of the preferred embodiment of the present invention 10 may be positioned adjacent to a secondary cleansing flume 130. The secondary cleansing flume 130 may be provided when it is desired, or necessary, to perform further chilling, treating, cleaning, or chlorinating of the foodstuffs 34. Preferably, the secondary cleansing flume 130 comprises a plurality of semi-cylindrical members 14A that are interconnected by means of connecting portions 112 to form the substantially long secondary flume 130. Preferably, a secondary loading assembly 12A is positioned adjacent to the overflow assembly 16 for receiving foodstuffs therefrom.

The connecting portions 112 preferably comprise arcuate elbow tubing, having a cylindrical cross-sectional configuration and an open upper side 132. The arcuate configuration of the connecting portions 112 maintains the flow rate of the slurry 36 passing through the flume 130, since there are no corners or edges that would interfere with the slurry 36 flowing through the flume 130. The connecting portions 112 range from 1 degree to 180 degrees in curvature, so that interconnected members 14A of the secondary cleansing flume 130 can extend at any desired angle relative to one another, depending upon the desired path of the secondary flume 130. Therefore, the secondary cleansing flume 130 can be configured for maximizing compactness thereof and to optimize workspace occupied thereby. An overflow assembly 16A then passes product 34 to de-watering means, as previously discussed.

Spray nozzles 78 are spatially positioned along the semi-cylindrical members 14A and connecting portions 112 of the secondary cleansing flume 130. The spray nozzles 78 of the secondary flume 130 perform and operate as previously discussed. The distance between adjacent spray nozzles 78, ranges from about 18 inches to 36 inches along the members 14A and from about 12 inches to 30 inches along the connecting portions 112 since primary cleaning of the foodstuffs 34 has been achieved in the cleansing flume 14 of the invented apparatus 10.

Thus, there has been described an improved apparatus for industrial washing of a number of different types of foodstuffs ranging from plant products, such as leafy vegetables for example, to fish, such as sardines, and other similar foodstuffs. The invented apparatus comprises a product loading assembly coupled to a cleansing flume that is coupled to an overflow assembly. The loading assembly has a plurality of spray nozzles located about its inner periphery that coact to form a dense and low pressure shower that flows therethrough for completely submerging product disposed therein to form a product slurry. The configuration of the nozzles and conical loading assembly coact to dissipate the energy of water streams output by the nozzles and prevent damage to the foodstuffs due to the foodstuffs contacting non-curvilinear surfaces. The flume has a generally cylindrical cross-sectional configuration to aid fluid flow therethrough to inhibit the slurry from collecting therein and to prevent the collection of dirt and debris. The spray nozzles positioned along the flume project streams of water upwardly along the curvilinear side walls of the flume to form a dense shower that propels product in the slurry beneath the surface of water to break apart the product and ensure that the product is adequately cleaned, without damaging the product. A drain is provided along the length of the cleansing flume for receiving particulate matter from foodstuffs. The drain includes actuation means that is configured to allow actuation thereof while the product slurry is passing through the flume for maintaining product processing rates. The overflow assembly maintains the water level of the flume and prepares product for transference to subsequent processing means.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for industrial washing of different types of foodstuffs, the apparatus comprising:

a foodstuff loading assembly including a foodstuff receiving section having an opening configured to receive large volumes of foodstuffs, a plurality of spray nozzles located about an inner periphery of the opening, the nozzles positioned about the inner periphery of the receiving section so that when a fluid is sprayed from each of the nozzles, a first dense shower is formed in the loading assembly for substantially submerging foodstuffs disposed therein to reduce a large foodstuff mass to a slurry;

a fluid control manifold coupled to a fluid source and to the spray nozzles for controlling the flow rate of the fluid output by the spray nozzles;

a cleansing flume coupled to the loading assembly for receiving the slurry therefrom for cleaning the foodstuffs, the flume having a generally cylindrical cross-sectional configuration to facilitate fluid flow therethrough and to inhibit the accumulation of particulate matter therein, an inlet end of the flume coupled to the loading assembly for receiving the slurry therefrom, the flume including a plurality of spray nozzles positioned along each side thereof and coupled to the manifold, the nozzles projecting streams of water upwardly along the inner periphery thereof, such that the streams of water cascade toward a center region of the flume to form a second dense shower, the second dense shower propelling foodstuffs in the slurry beneath a surface of the water flowing through the flume for cleaning the foodstuffs without causing harm thereto; and an overflow assembly coupled to an outlet end of the cleansing flume for maintaining the level of the slurry passing therethrough, the overflow assembly having an output portion configured to position foodstuffs for transference to subsequent processing means.

2. The apparatus of claim 1 wherein the plurality of spray nozzles are spatially positioned along each side of the flume so that the nozzles project a multiplicity of streams of water upwardly along the inner periphery thereof, such that the multiplicity streams of water cascade toward a center region of the flume to form a continuous series of low pressure, dense showers causing and maintaining a turbulent fluid flow of the slurry as it flows through the flume for causing foodstuffs in the slurry to be substantially completely submerged to facilitate removal of unwanted particulate matter from foodstuffs, the turbulent flow of the slurry breaking apart adhered portions of the foodstuffs to ensure that the foodstuffs are adequately cleaned without causing damaging thereto.

3. The apparatus of claim 2 wherein each of the nozzles has an outlet end that extends flush with an inner periphery of the flume to prevent foodstuffs flowing through the flume from contacting by any portion of the nozzle to inhibit damage the foodstuffs and clogging of the flume.

4. The apparatus of claim 1 wherein the foodstuff loading assembly further comprises:

the foodstuff receiving section having a conical cross-sectional configuration;

a conical transitional section made integral with the receiving section for coupling the loading assembly to the flume, the transitional section tapering the diameter of the loading assembly from a wide opening down to the diameter of the flume, the conical cross-sectional configuration of the transitional section and of the receiving section enhancing flow of the slurry through the loading assembly to prevent clogging thereof and provide fast foodstuff processing rates, the configuration of the loading assembly inhibiting the collection of debris and unwanted particulate matter therein to maintain sanitation thereof; and the configuration of the plurality of spray nozzles and conical receiving section coacting to develop the first dense, low pressure shower for forming the slurry, without subjecting the foodstuffs to excessive water pressure, to inhibit damage thereto.

5. The apparatus of claim 1 wherein the overflow assembly further comprises:

an inlet portion coupled to the flume for receiving the slurry therefrom;

the output portion having a splayed configuration and an upwardly extending bottom wall for maintaining the water level in the flume, the splayed output portion having a diameter greater than the diameter of the flume for distributing foodstuffs across the width of the bottom wall for transforming the foodstuffs from a narrow mass as the slurry is exiting the flume, to a wide mass as the foodstuffs are exiting the apparatus for transference to subsequent processing means.

6. The apparatus of claim 1 further including a drain means affixed to the flume, the drain means affixed to the flume for receiving particulate matter as it is removed from foodstuffs passing along the flume, the drain including actuation means for removing particulate matter therefrom.

7. An apparatus for industrial washing of different types of foodstuffs, the apparatus comprising:

a foodstuff loading assembly comprising, a conical foodstuff receiving section having an opening configured to receive large volumes of foodstuffs continuously disposed therein, a plurality of turbulence spray nozzles positioned about an inner periphery of the opening, the turbulence nozzles configured to extend substantially flush with the inner periphery of the receiving section so that the configuration of the turbulence nozzles and conical configuration of the receiving section coact to dissipate the energy of water streams output by the turbulence nozzles to develop a first dense, low pressure shower in the loading assembly for substantially submerging foodstuffs disposed therein to reduce a large foodstuff mass to a slurry without subjecting the foodstuffs to excessive water pressure, and a conical transitional section made integral with the receiving section for tapering the diameter of the wide opening, the conical configuration of the transitional section and receiving section enhancing the flow of the slurry through the loading assembly to prevent clogging thereof and provide fast foodstuff processing rates, the configuration of the loading assembly inhibiting the collection of debris and unwanted particulate matter therein to maintain sanitation thereof, the conical configuration of the receiving section and transitional section and configuration of the turbulence nozzles preventing damage to foodstuffs since to the foodstuffs do not contact non-curvilinear surfaces;

a fluid control manifold coupled to a fluid source and to the spray nozzles, the manifold configured with a flow control valve for each group of spray nozzles for controlling the flow rate of water output thereby to prevent damage to foodstuffs disposed in the loading assembly, while maintaining optimal mixture of the foodstuffs and water when forming the slurry;

an elongated cleansing flume coupled to the loading assembly for receiving the slurry therefrom for cleaning the foodstuffs, the flume having a generally cylindrical cross-sectional configuration to facilitate fluid flow therethrough and to inhibit the accumulation of particulate matter therein, an inlet end of the flume coupled to the transitional section for receiving the slurry from the loading assembly, the flume having an open top side for enabling access to an interior thereof, the flume further including, a plurality of spray nozzles spatially positioned along each side of the cleansing flume to form opposing pairs of nozzles and coupled to the water source via the manifold, the nozzles oriented along the length of the flume such that a multiplicity of opposing pairs of nozzles are formed, each pair of opposing nozzles spraying a stream of water that is projected upwardly along an inner periphery of arcuate side walls of the flume and then cascades towards a center region thereof, the cascading streams of water conflux to form a continuous series of dense, low pressure showers, with the configuration of the nozzles and arcuate side walls of the flume coacting to sufficiently dissipate the energy of the streams of water so that foodstuffs passing through the flume are not damaged by the force of the water, the continuous series of dense showers causing and maintaining a turbulent fluid flow of the slurry as it flows through the flume propelling foodstuffs in the slurry beneath a surface of the water flowing through the flume for breaking apart adhered portions of the foodstuffs to substantially completely submerge the foodstuffs to facilitate removal of unwanted particulate matter therefrom to ensure that the foodstuffs are adequately cleaned without causing damaging thereto, and an elongated drain means affixed to the flume for receiving particulate matter as it is removed from foodstuffs passing along the flume, the drain including actuation means for removing particulate matter therefrom; and an overflow assembly coupled to an outlet end of the cleansing flume, the overflow assembly comprising, an inlet portion coupled to an outlet end of the flume for receiving the slurry therefrom, at least one spray nozzle located in an inner periphery of the inlet portion and coupled to the water source via the manifold, the spray nozzle perform final rinsing of foodstuffs in the slurry, and a splayed output portion having an upwardly extending bottom wall for maintaining the water level in the flume, the splayed output portion having a diameter greater than the diameter of the flume for distributing foodstuffs across the width of the bottom wall for transforming the foodstuffs from a narrow mass as the slurry is entering the inlet portion, to a wide mass as the foodstuffs are exiting the apparatus for transference to subsequent processing means, the bottom wall having a downturned lip to inhibit damage from coming to the foodstuffs due to contacting an edge.

8. The apparatus of claim 7 wherein each of the plurality of turbulence inducing spray nozzles has a generally parabolic configuration along its length and a slightly less than hemispheric cross sectional dimension so that the nozzles extend substantially flush with the inner periphery of the receiving section to dissipate the energy of water streams output thereby.

9. The apparatus of claim 7 wherein the fluid control manifold further comprises:

a plurality of valve means for controlling the flow rate of water flowing to each group of spray nozzles for controlling the flow rate of water output by the nozzles, the manifold preferably releasably mounted to the transitional section so that it may be quickly detached therefrom for performing maintenance thereon, the manifold comprising a simplistic design so that sanitation and other maintenance procedures can be performed thereon without the use of tools.

10. The apparatus of claim 7 wherein the cleansing flume further comprises:

an inlet end of the flume coupled to the transitional section for coupling the flume to the loading assembly while the outlet end is coupled to the overflow assembly;

the open top side configured sufficiently narrow to inhibit water passing therethrough from spilling and sufficiently wide to allow access to the interior thereof.

11. The apparatus of claim 10 wherein the cleansing flume further comprises:

an upwardly projecting side wall affixed to each side edge of the open top side, the side walls further inhibiting water from spilling from or splashing out of the flume to enable the flume to pass greater amounts of water therethrough so that the flow rate of water circulating through the flume can be increased, for increasing the amount of foodstuffs continuously disposed in the loading assembly, for increasing the processing rates of the apparatus.

12. The apparatus of claim 11 wherein the cleansing flume further comprises:

a lid configured to enclose the open top side of the flume, the lid having sides configured to mate with the upwardly projecting side walls of the open top side and arcuate bottom wall, the arcuate bottom wall having a curvature substantially analogous to a curvature of the flume to form a substantially cylindrical tube when the lid is coupled to the flume, the lid enclosing the open top side to substantially inhibit water or slurry from spilling or splashing out of the top side, so that the flume can be substantially filled with the slurry and water for enabling greater amounts of foodstuffs to be disposed in the loading assembly, for substantially increasing the process rates of the apparatus.

13. The apparatus of claim 10 further comprising:
a secondary cleansing flume for further treating and cleaning of foodstuffs, the secondary cleansing flume comprising,
a secondary product loading assembly positioned to receive foodstuffs from the overflow assembly of the apparatus,
a secondary overflow assembly for outputting foodstuffs treated thereby,
a plurality of semi-cylindrical members extending between the secondary loading assembly and the secondary overflow assembly, the semi-cylindrical members interconnected to form a substantially long flume, and
a plurality of connecting portions coupled to the semi-cylindrical members for interconnecting the semi-cylindrical members, the connecting portions enabling a desired path of the secondary flume to be altered while maintaining the flow rate of the slurry passing therethrough, the connecting portions comprising arcuate elbow tubing having a cylindrical configuration and dimensioned analogous to the semi-cylindrical members for interconnecting adjacent members.

14. The apparatus of claim 13 wherein the connecting portions range from approximately 1 degree to approximately 180 degrees in curvature, so that interconnected members of the flume can extend at any desired angle relative to one another, depending upon the desired path of the flume.

15. The apparatus of claim 7 wherein the spray nozzles of the cleansing flume further comprise:
the nozzles affixed to the periphery of the flume, such that they extend at an inclined angle to a longitudinal axis thereof, each of the nozzles having an outlet end with an arcuate configuration, so that the outlet end extends flush with the inner periphery of the arcuate side walls of the flume, the arcuate outlet ends extend flush with the inner periphery of the side wall so that foodstuffs flowing through the flume are not contacted by any portion of the nozzle.

16. The apparatus of claim 15 wherein the water supplied to each of the nozzles may be aerated to enhance cleaning of the foodstuffs.

17. The apparatus of claim 7 wherein the elongated drain means further comprises:
an elongated generally rectangular member that extends substantially the length of the flume beneath an opening formed in a bottom surface of the flume, the drain is tapered along its length, such that the drain tapers from a substantially shallow end adjacent to the loading assembly to a substantially deep end adjacent to the overflow assembly, the drain tapered along its length to facilitate removal particulate matter therefrom by means of gravity and the force of water flowing therethrough; and
the actuation means coupled to the deep end of the drain and actuated to force particulate matter out of the drain for enabling the drain to receive further particulate matter, the actuation means configured to allow actuation thereof, while the slurry is flowing through the flume so that maintenance may be performed on the drain means without interruption to foodstuffs being processed by the apparatus, for maintaining the processing rates thereof.

18. The apparatus of claim 17 wherein the elongated drain means further comprises a screen positioned over the opening in the bottom surface of the flume, the screen having a suitable mesh that prevents foodstuffs from inadvertently entering the opening in the bottom surface and drain means, while allowing particulate matter to pass therethrough.

19. The apparatus of claim 18 wherein the cleansing flume further comprises flow diverters positioned along the bottom surface thereof, the flow diverters affixed to the bottom surface of the flume so that they transverse the bottom surface and opening therein for aiding with maintaining the turbulence of the slurry, the flow diverters oriented in the flume at an acute angle relative to the longitudinal axis thereof for inhibiting damage from coming to foodstuffs comprising the slurry, a top edge of each of the flow diverters configured to prevent damage from coming to the foodstuffs, when the foodstuffs contact the flow diverters.

* * * * *